March 7, 1961 H. J. BILLING 2,973,951
SPRING ASSEMBLIES
Filed Jan. 21, 1959 3 Sheets-Sheet 1
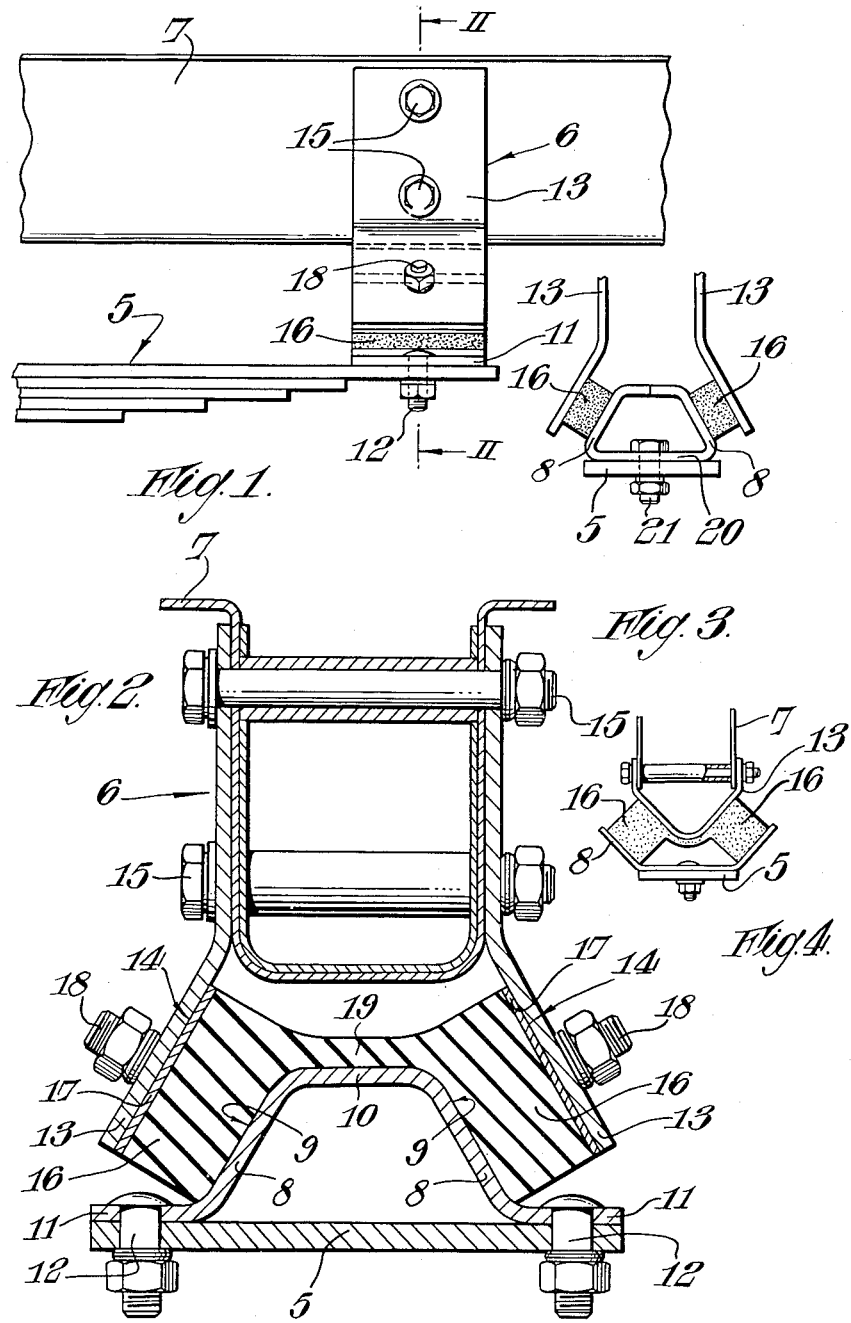

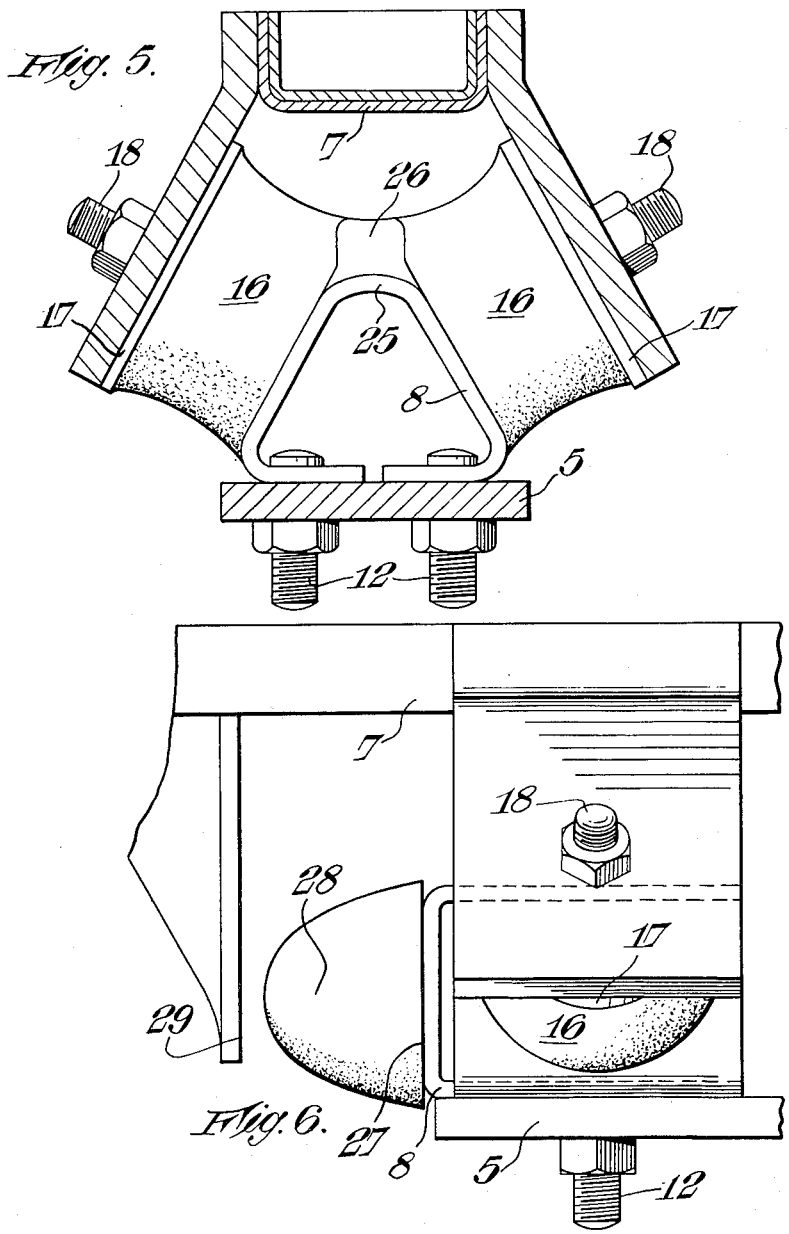

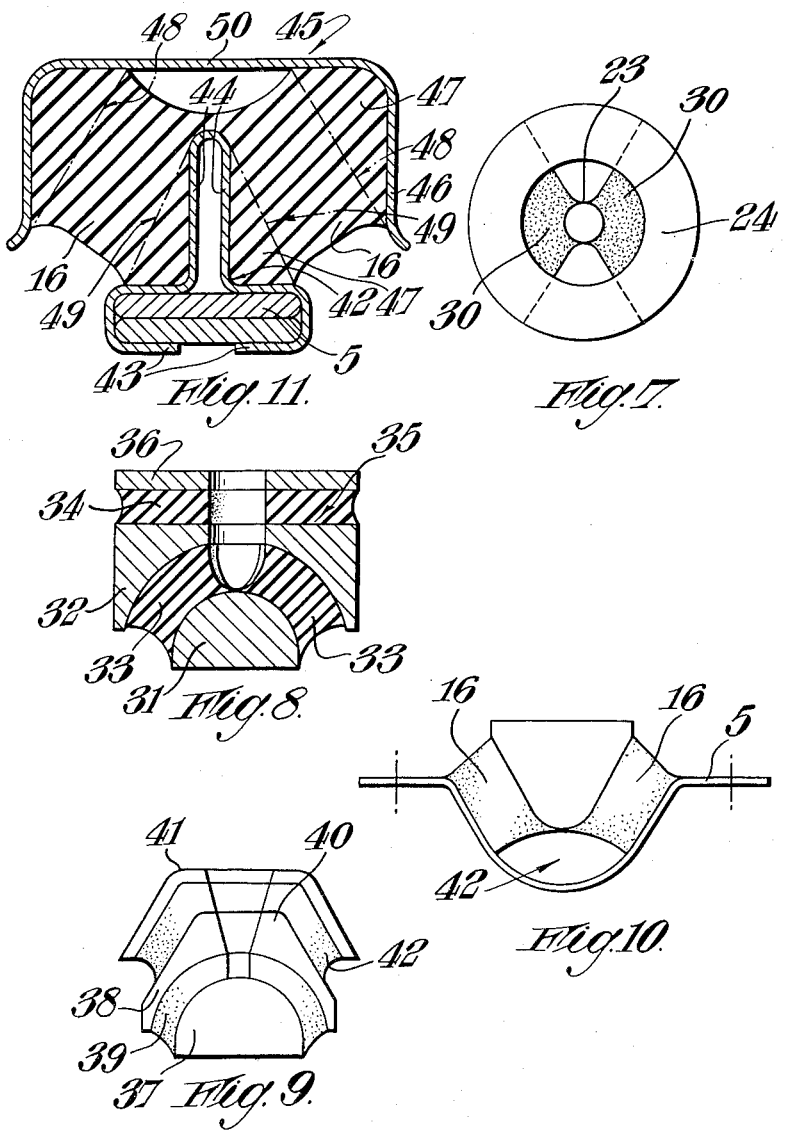

United States Patent Office 2,973,951
Patented Mar. 7, 1961

2,973,951

SPRING ASSEMBLIES

Henry James Billing, Blaby, England, assignor to Metalastik Limited, Leicester, England, a British company Filed Jan. 21, 1959, Ser. No. 788,121

Claims priority, application Great Britain Jan. 21, 1958

6 Claims. (Cl. 267—30)

In road vehicles a large amount of the vibration present in the body of the vehicle derives from the tyres, transmission, and engine and it is conducted to the body through the springs (e.g. leaf springs) upon which the body is mounted.

It is well known in road vehicles to provide a rubber bush at either or both eyes of a leaf spring and commonly the attachment pins (e.g. shackle pins) constitute the inner member of a rubber bush assembly comprising concentric inner and outer members and a rubber interlayer.

While this arrangement has some effect in reducing conduction of vibrations through the springs the effect is not as great as could be desired because the necessity of providing a rubber bush of adequate lateral stiffness so reduces the size of the bush that its ability to absorb vibrations is inadequate.

The object of this invention is the provision of an attachment for the end of a leaf spring which, as compared with known arrangement referred to, has adequate vibration-absorbing ability without impairment of lateral stiffness.

According to the invention a spring assembly comprises a leaf spring and an end-attachment means for the spring, said means comprising one pair of members having external convergent surfaces and another pair of members having internal convergent surfaces which confront, one each, said first pair of members (one of said pair of members being secured to the flat face at the end of the leaf spring and the other pair of said members being secured to the part to which the leaf spring is to be attached e.g. the frame or chassis of a road vehicle) and rubber or like blocks interposed between each pair of confronting surfaces the arrangement being that loads applied to deflect the spring subject the rubber or like blocks to combined shear and compression. The confronting faces may extend lengthwise of the leaf spring or may be inclined to said direction.

Preferably each of said first pair of members is integral with a bridge piece and the rubber-like elements are bonded to the confronting faces of said members and to a pair of plates which are adapted to abut, one each, said other pair of members, said plates being provided with means for removably securing the rubber-like elements to the abutted pair of members. In this way the first pair of members, the rubber-like elements and the securing means constitutes a pre-fabricated assembly for convenient attachment to the leaf spring and, for example, to said frame or chassis.

The spring assembly may comprise end-attachment means as above set forth at one end, or both ends, of the leaf spring. When such means is provided at one end only the other end may have a rolled eye and a rubber-bush attachment.

Practical applications of the present invention will now be described, by way of example only, with reference to the accompanying drawings whereof:

Fig. 1 is a side view of a spring assembly according to the present invention,

Fig. 2 is a section on the line II—II of Fig. 1 and to a larger size,

Fig. 3 is a view similar to Fig. 2 showing an alternative construction,

Figs. 4 and 5 are views similar to Fig. 3 showing two further alternative constructions, Fig. 6 is a side view of the assembly of Fig. 5, Fig. 7 is a plan view of another end-attachment means of this invention, and Figs. 8, 9, 10 and 11 are end views of other constructions of end-attachment means according to this invention.

Referring to Fig. 1: the spring assembly comprises a leaf spring 5 which, when loaded, is substantially flat and an end-attachment means generally indicated by the reference numeral 6. The means 6 is provided to attach the end of the leaf spring 5 to the chassis or frame 7 of a road vehicle.

Referring to Fig. 2: the end-attachment means 6 comprises one pair of members 8 having external convergent inclined surfaces 9. The pair of members 8 are integral with a bridge piece 10 and with side flanges 11. The side flanges receive bolts 12 by which the pair of members 8 are secured to the end of the spring 5. The surfaces 9 extend lengthwise of the spring 5.

The attachment means also comprises a further pair of members 13 having internal convergent inclined surfaces 14 which confront, one each, the pair of members 8. The members 13 are secured by the bolts 15 to the chassis 7. The attachment means also comprises elements or blocks 16 of rubber-like material interposed between each pair of confronting surfaces 9 and 14.

In use: a normal applied load acts vertically downwardly to deform the spring 5 and the load is resisted by the blocks 16 acting in combined shear and compression.

A leaf spring as described has small lengthwise movement with rising and falling movement due to variation in the applied load and such lengthwise movement as occurs is readily accommodated by the rubber blocks 16. This movement is provided for by the blocks in shear and therefore the movement is substantially free of restraint.

Depending upon the inclination of the members 8 and 13 the relative extent to which lateral movement is resisted by the blocks 16 in combined shear and compression will vary and it may be readily arranged that the blocks provide a relatively high lateral stability by ensuring that sideways loads are resisted by the blocks mainly in compression. The invention enables relatively large blocks of rubber-like material to be used while providing good lateral stability with the consequence that vibrations are more readily absorbed by the rubber blocks. Because the size of the blocks is relatively large the stress therein is reduced. The attachment described dispenses with the rolled eye of the leaf spring which is a common source of failure, the eye being a region of weakness and of high stress.

The blocks 16 are bonded to metal plates 17 which carry bolts 18 for attaching the members 13 to the rubber blocks.

As shown in Fig. 2 it is preferred that the rubber blocks are joined together, as at 19, the portion 19 overlying the bridge piece 10 and constituting a buffer for engagement with the chassis 7 upon the application of excessive load.

An alternative construction is illustrated in Fig. 3 in which the members 8 are integral with a bridge piece 20 which is bolted, at 21, to the leaf spring 5.

Fig. 4 shows an assembly which is an inversion of the arrangement of Fig. 2. The compression axes of the blocks 16 converge upwardly instead of converging downwardly as in Fig. 2.

In Fig. 5 the rubber blocks 16 are bonded to a triangular member 8 which is secured to the leaf spring 5 by studs 12, the apex of member 8 being rounded somewhat, at 25, and the blocks 16 being connected by a rubber buffer element 26 which is bonded to member 8. The outer ends of the blocks 16 are bonded to plates 17 carrying attachment studs 18 as in the construction of Fig. 2. In Fig. 6 it will be observed that the member 8 has an end wall 27 which carries a rubber buffer 28 engageable with a plate 29 secured to frame 7. Upon excessive outward end deflection (i.e. longitudinal movement) of the leaf spring 5 the buffer 28 engages plate 29 and, due to the somewhat parabolic outline of the buffer the resistance to such deflection becomes increasingly greater. A similar, or other suitable, buffer arrangement may be provided to deal with vertical, lateral or inward end deflections.

The pair of members may be conical and coaxial as in Fig. 7. The outer member is indicated at 24, the inner member is not shown. A pair of conical sectors 30 of rubber, joined at 23, are sandwiched between the co-axial conical members. In effect the construction is fundamentally similar to Fig. 2 wherein the confronting surfaces are curved lengthwise of the leaf spring 5. By suitable selection of the cone angle and the angular extent of the sectors 30 the relative relationship of the stiffness laterally and longitudinally and vertically is varied to suit particular requirements.

Instead of the conical construction of Fig. 7 a truncated pyramid construction may be used with corresponding rubber blocks.

The inner and outer members 31, 32 of Fig. 8 have part-spherical confronting surfaces with a common centre of curvature. Separate rubber blocks 33 of corresponding shape are sandwiched between the members 31, 32. In this construction the member 32 has a flat top 35, and a rubber plate 34 is sandwiched between the flat top and a plate 36 for attachment to the chassis or frame (not shown). The plate 34 acts in shear for longitudinal and lateral movements. A similar arrangement of sandwich 34, 35, 36 may be provided in any of the other constructions described. The superposed sandwich construction reduces the stiffness in both said directions and thus serves as an ancillary means for obtaining a required relationship between the lateral, vertical and longitudinal stiffnesses where this may not conveniently be done by design and arrangement of the blocks 16 or 33 alone.

The assembly of parts 31, 32 and 33 (plates 34, 36 being omitted) may be used as an end attachment for a leaf spring.

In Fig. 9 the members 37, 38 are part spherical and a substantially semi-spherical rubber interlayer 39 is sandwiched between the members. Superposed on member 38 is the assembly comprising polygonal members 40, 41 and rubber blocks 42 therebetween. The assembly 37, 38, 39 has great stiffness laterally and longitudinally (the stiffness being the same in both directions). The vertical stiffness is also great. The superposed assembly modifies these characteristics since it has very small longitudinal stiffness. The combined results are such that, for instance, the lateral stiffness is greater than the vertical stiffness and the vertical stiffness is greater than the longitudinal stiffness.

The member having the inner convergent surfaces may be formed by the leaf spring (Fig. 10). The spring 5 is depressed at 42 to receive blocks 16, the walls of the depression constituting the inner convergent surfaces referred to above. The depression may be local or extend over part or the entire length of the spring.

Referring now to Fig. 11: the leaf spring 5 receives a T-piece 42 which is attached by its cross member 43 to the spring. The other part of the T-piece comprises a pair of limbs 44 which are normal to the plane of the leaf spring. In effect the T-piece is comprised of two L-shaped plates although separate L plates could be used instead of the T-piece. An inverted U-member 45 has skirt portions 46 which are parallel to the limbs 44. A cross member 50 is secured to the frame or chassis. Again the U-member is effectively constituted by two L-shaped plates. Separate L plates may be used instead of the U-member. A rubber block 16 is interposed between each limb 44 and its confronting skirt 46. The ends of the blocks are integral with wedge-shaped masses 47 of rubber each of which is received between the L plates of member 45 and of T-piece 42. The masses 47 are bonded to the T-piece and the U-member and the plates constitute backing plates for the bonded units 16, 47. The masses 47 are constrained by the backing plates against deformation, and these masses form no effective part of the rubber blocks 16. The masses 47 may be considered as a filling to provide the L backing plates with inclined confronting surfaces 48, 49 where the attachments 44, 46 are all parallel and normal to the plane of the leaf spring.

In each arrangement described the rubber blocks act in combined shear and compression under loads deflecting the leaf spring. The relative stiffnesses of the rubber blocks for vertical, lateral and longitudinal deflections are conveniently selectable to suit particular conditions of use as more fully discussed in relation to Figs. 1 and 2. In general it is arranged that the lateral stiffness is greater than the vertical stiffness and the vertical stiffness is greater than the longitudinal stiffness.

The mass of rubber used is much greater than in shackle pins with rubber bushes so that better insulation results without impairment of the stability of a vehicle fitted with leaf springs according to this invention.

The vertical deflection of the leaf spring is not greatly resisted by the rubber blocks, the latter in the arrangement of Figs. 1 and 2 for example, being subjected to torsional shear.

I claim:

1. A spring assembly for a vehicle having chassis and running gear structures comprising a leaf spring secured to one of said structures, and an end attachment means for said spring, said means comprising one pair of members having external converging surfaces, rigid means bridging said members at their closest ends, and another pair of members having internal converging surfaces which confront respectively the surfaces of said one pair, one of said pair of members being secured to one end of the leaf spring and the other pair of said members being secured to the other of said structures, a resilient member interposed between the chassis and running gear including a resilient block of rubber-like material between each of the confronting surfaces, each of the surfaces of one pair being removably secured to said block and the surfaces of said other pair being bonded to said resilient block, and normally uncompressed buffer means of rubber-like material in a strip of lesser thickness than said block integrally connected with said blocks and extending over said bridging means to provide a buffer for excessive loads.

2. An assembly according to claim 1 in which the stiffness of the rubber blocks in a direction laterally of the leaf spring is greater than the stiffness of the blocks in the vertical direction and wherein said vertical stiffness of the blocks is greater than the stiffness of the blocks in a direction longitudinally of the leaf spring.

3. An assembly as claimed in claim 1 in which the confronting surfaces are plane and extend lengthwise of the leaf spring.

4. A spring assembly for a vehicle having chassis and running gear structures comprising a leaf spring secured to one of the structures and an end-attaching means for the spring, said means comprising one pair of members having spaced confronting surfaces and another pair of members extending into the space between the surfaces and having rigid means bridging the ends extending into the space, one of said pairs of members being secured to a flat face at the end of the leaf spring and the other pair of said members being secured to the other of the structures, a resilient member interposed between the running gear and chassis including a resilient block of rubber-like material between each of the confronting surfaces, each of the two pairs of members further comprising an L-shaped backing plate arranged with one limb of all the backing plates parallel and extending substantially normal to the plane of the leaf spring and wherein each rubber block is interposed between each pair of backing plates, the ends of the rubber block being integral with wedge-shaped masses of rubber which are received between the limbs of the backing plates and are substantially constrained by the backing plate against deformation, the constrained wedge-shaped masses providing convergent, confronting surfaces, and a normally uncompressed buffer strip of rubber-like material of lesser thickness than the blocks integrally connected between one end of each of the blocks and extending over the bridging means to provide a buffer upon application of excessive loads, whereby loads applied to deflect the spring subject the rubber-like blocks to combined shear and compression.

5. An assembly as claimed in claim 4 wherein one pair of backing plates constitute part of a T-piece which is attached, by its cross member to the leaf spring and the other pair of backing plates constitute a U-member.

6. An assembly according to claim 1 in which the means for removably securing each of the convergent surfaces of one pair to a surface of a resilient block comprises a rigid member bonded to the surface of the resilient block adjacent a convergent surface, and means secured to the rigid member extending through the adjacent converging surface.

References Cited in the file of this patent

UNITED STATES PATENTS

| | | |
|---|---|---|
| 2,788,250 | Blattner | Apr. 9, 1957 |
| 2,831,674 | Brown et al. | Apr. 22, 1958 |

FOREIGN PATENTS

| | | |
|---|---|---|
| 756,981 | France | Oct. 2, 1933 |
| 718,344 | Germany | Mar. 10, 1942 |
| 545,841 | Great Britain | June 16, 1942 |
| 132,664 | Sweden | May 24, 1951 |
| 1,140,984 | France | Mar. 11, 1957 |
| 1,158,321 | France | Jan. 20, 1958 |
| 968,701 | Germany | Mar. 20, 1958 |